United States Patent
Dineen

[11] 3,710,241
[45] Jan. 9, 1973

[54] APPARATUS FOR DETECTING FAULTS IN EXTRUDED INSULATING OR DIELECTRIC MATERIAL

[75] Inventor: William R. Dineen, Tallmadge, Ohio

[73] Assignee: Dineen Enterprises, Inc., Tallmadge, Ohio

[22] Filed: Sept. 8, 1970

[21] Appl. No.: 70,412

[52] U.S. Cl. ................................... 324/54, 18/13 D
[51] Int. Cl. ............................................. G01r 31/12
[58] Field of Search ..... 324/54, 61 TI; 18/13 S, 13 D; 203/593; 425/162, 169, 381, 141

[56] References Cited

UNITED STATES PATENTS

| | | | |
|---|---|---|---|
| 3,446,884 | 5/1969 | Miller et al. | 425/381 X |
| 3,418,570 | 12/1968 | Clinton | 324/54 |
| 3,466,537 | 9/1969 | Eigen | 324/54 |
| 3,045,281 | 7/1962 | Skobel | 324/54 X |
| 2,456,704 | 12/1948 | Henning | 324/54 |
| 2,894,204 | 7/1959 | Gambrill | 324/54 |
| 2,900,597 | 8/1959 | Gooding | 324/54 |

FOREIGN PATENTS OR APPLICATIONS 761,241 11/1956 Great Britain ..................... 324/61 TI

*Primary Examiner*—Gerard R. Strecker
*Attorney*—Oldham & Oldham

[57] ABSTRACT

Disclosed is a method of detecting faults or discontinuities in the insulating or dielectric properties of an extruded tube. A high voltage potential is established between a ring which surrounds the tube as it emerges from the extrusion die and the extrusion core. Any conduction between the ring and the core unbalances a bridge network which then activates a relay to indicate the presence of a fault or discontinuity. A die or paint sprayer or a warning device may also be controlled by the relay to mark the location of the fault or defect.

6 Claims, 4 Drawing Figures

INVENTOR.
WILLIAM R. DINEEN
BY
Oldham & Oldham
ATTORNEYS

APPARATUS FOR DETECTING FAULTS IN EXTRUDED INSULATING OR DIELECTRIC MATERIAL

In the extrusion of rubber, plastic, or other dielectric or insulating materials for use as thin wall tubing or cable insulation, for example, it is imperative that the extrusion be of uniform insulating properties and without any voids or faults. The faults may be in the form of pin holes through the extruded tube or variations in the tube wall thickness or material composition. Heretofore, several methods have been proposed for testing the continuity of cable insulation. However, all of these methods require the cable insulation to be tested separately from the extrusion process and thus require additional handling of the cable. Preferably, the scanning of the cable insulation for defects should be performed along with the extruding process both to provide for the immediate detection of any cable or tube faults and to provide a continuing monitoring of the extrusion process so that any defects which appear can perhaps be immediately corrected in the extrusion process.

It is the primary object of the present invention to provide a method and apparatus for detecting faults in extruded insulating or dielectric material which may be operated in conjunction with the extruder.

It is also an object of the present invention to provide a device for detecting faults in extruded insulating or dielectric material which is of simple construction, utilizing the extruder structure as a supporting framework for the detector.

It is also an object of the present invention to provide a fault detector for extruded insulating or dielectric materials which is capable of providing trouble-free operation over long periods of time.

The above and other objects of the invention which will become apparent in the following detailed description are achieved by providing a detector which includes a conductive ring which surrounds the extruded tubing as it advances from the extrusion die. This ring is maintained at a high voltage potential while the extruder core is maintained at the ground potential. A detector circuit which includes a normally balanced bridge is connected so that any conduction between the ring and the grounded extruder core unbalances the bridge network to energize a fault indicating circuit.

For a more complete understanding of the invention and of the objects and advantages thereof, reference should be had to the following specification and the accompanying drawings wherein there is shown a preferred embodiment of the invention.

Figure 1:
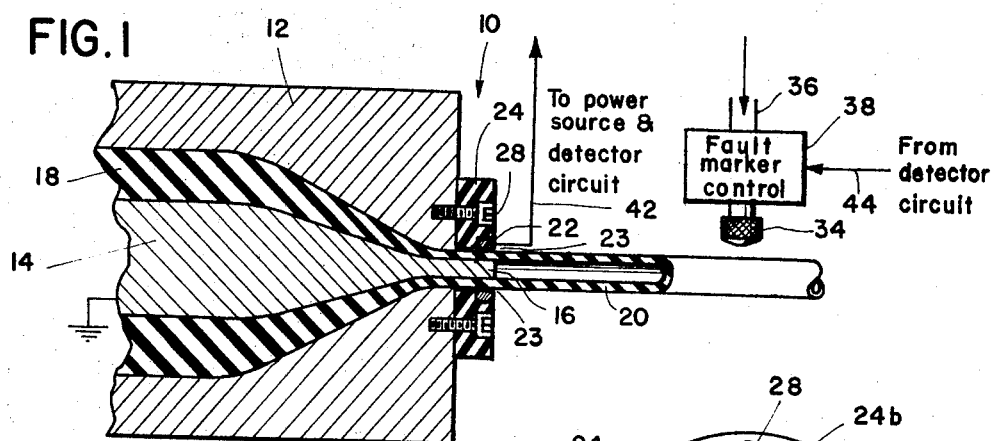
FIG. 1 is a fragmentary sectional view through the die portion of an extruder and showing the high voltage ring and fault marking mechanisms of the present invention.
Figure 3:
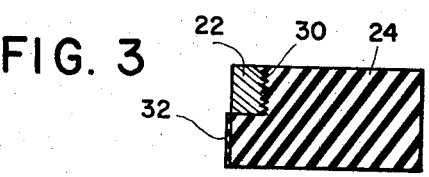
FIG. 3 is a sectional view taken along the line 3—3 of FIG. 2.
Figure 2:
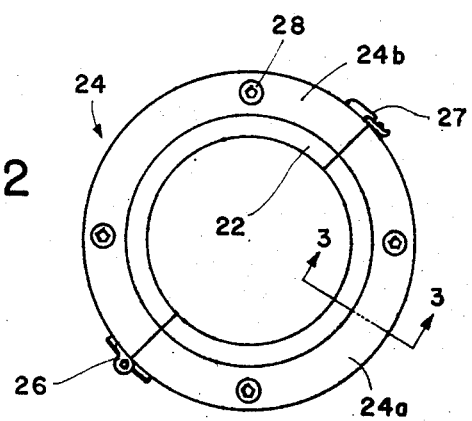
FIG. 2 is an end elevational view of the high voltage ring and its associated mounting ring.

Referring first to FIGS. 1-3, there is shown a portion of an extrusion press 10 which includes a die block 12 and a core 14 which has an end portion 16 which projects through the die opening of the block 12. The extrusion press 10 may be of any conventional type and is designed to force a mass of rubber or plastic material 18 through the annular opening between the die block 12 and the end portion 16 of the core 14 to form a length of tubing 20.

Closely adjacent the outer end of the die block 12 and concentric about the core end 16 and the extruded tube 20, there is provided a ring 22 which is connected to the high voltage power source and detector circuitry to be described below. The ring 22 is formed of a suitable conductor, for example, aluminum, and it is carried by a support ring 24 which is formed of a suitable dielectric material, for example, epoxy or fiberglass. The ring 22 is separated and thereby insulated from the metal extrusion die 12 by the support ring 24. Preferably, the support ring 24 is bolted directly to the die block 12 without any intermediate layers or gaskets to minimize the thermal expansion differential and to assure that the support ring 24 and the conductive ring 22 are maintained in correct concentricity with the extruded material. The support ring 24 may be either a continuous annular ring or formed of a pair of semicircular ring sections 24a and 24b which are joined together by a hinge 26 and held in a closed position by a suitable latch 27. The later construction of the ring assembly permits the detection ring to be installed on the extruder while the rubber or plastic is being extruded. Suitable bolts 28 are provided to secure the supporting ring 24 to the die block 12. As shown in FIG. 3, the conductor ring 22 may be threaded, as indicated at 30, into the supporting ring 24. The ring may also be anchored by a suitable adhesive. The inner face of the ring 24 may be provided with a non-friction coating 32 of, for example, Teflon, of between 0.001 to 0.003 inches thickness, as best seen in FIG. 3.

It is an important part of the invention that the inside diameter of the rings 22 and 24 be slightly larger than the outer diameter of the extruded tubing so that with the normal expansion of the tubing after it leaves the extruder head, it will normally not contact or only come into very light contact with the inside surface of the rings 22 and 24. This spacing is indicated by numeral 23 in FIG. 1.

In order to obtain an indication of where the fault occurs, there is provided a nozzle 34 for spraying paint or dye from a source 36 onto the extruded tube 20. The nozzle 34 is controlled by the fault marker circuit control 38 which is, in turn, controlled by the detector circuit to be described below. Preferably, the distance between the conductor ring 22 and the nozzle 34 is related to the rate of travel of the tube 20 from the extruder 10 and the time delay in the control 38 so that the time required for a fault detected adjacent the ring 22 to travel to a point adjacent the nozzle 34 is equal to the time necessary to initiate the spraying of the paint or dye so that a visual mark is provided on the tube 20 at the location of each fault detected.

Figure 4:
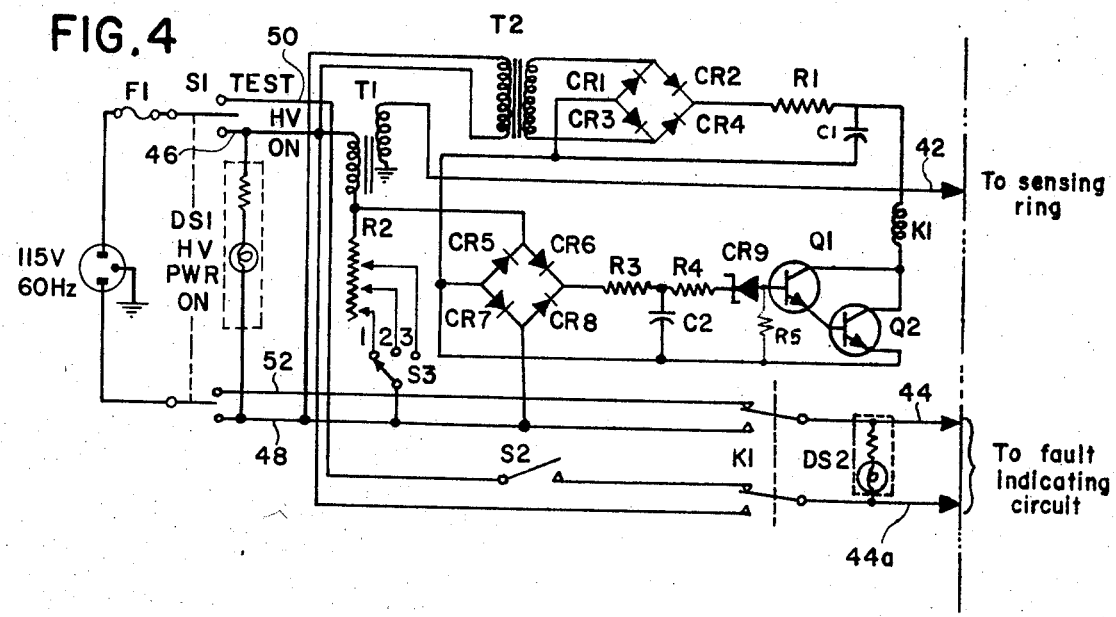
FIG. 4 is a schematic diagram of the detector circuitry.

The detector circuit is illustrated in FIG. 4. This circuit includes a connection 40 to a standard 115 volt 60 Hertz power supply which is connected by a switch S1 to either the conductors 46 and 48 supplying the detector circuit or the conductors 50 and 52 which provide for a test of the fault indicating marker circuit. The primary winding of a transformer T1 is connected across the conductors 46 and 48 through the resistor R2 and switch S3. A rectifier bridge network CR5–CR8 is also connected across the resistor R2 to the conductor 48. The transformer T1 is a step-up transformer with its secondary winding connected to ground and, through the conductor 42, to the conducting ring 22 mounted in the ring 24. Preferably, the transformer T1 maintains the ring 22 at a potential dictated by the distance between the ring 22 and the protruding end portion 16 of the core 14. A step-down transformer T2 is also connected across the conductors 46 and 48 to supply, through the bridge rectifier CR1-CR4, operating power for the relay K1. The supply circuit for the relay K1 is completed through the switching transistor amplifier circuits Q1 and Q2. The base of the transistor Q1 is connected to the bridge network CR5–CR8 through a Zener diode CR9. The network consisting of resistors R3 and R4 and capacitor C2 serves to filter the signal to the Zener diode CR9 so that a smooth DC signal is supplied to CR9. In the absence of a fault in the extruded tube, there is insignificant current flowing through the transformer T1 and the voltage at CR9 is approximately 70 volts This is below the conducting level of the Zener diode and as a result, Q1 and Q2 are held in a non-conducting state and the relay K1 is deenergized.

In the event of a fault in the extruded tube 20, ionization or conduction between the high potential ring 22 and the end 16 of the grounded extruder core will occur. As the result, current flows through the primary winding of the transformer T1 causing the voltage across R2 to rise. The bridge network CR5–CR8 now becomes unbalanced and the voltage at CR9 also rises to a level at which CR9 conducts. Q1 and Q2 now conduct completing the circuit for the relay K1. The contacts of the relay K1 now connect the conductors 44, 44a from the fault marker control circuit 38 to the conductors 46 and 48, thus actuating the marking circuit. At the same time, a visual indicating device DS2 is energized.

When a switch S1 connects the conductors 50 and 52 to the power source 40, a circuit to the fault indicating control is provided through the normally closed contacts of the relay K1 at a switch S2, bypassing the detector circuit. The switch S2 when closed thus provides a test for the indicating circuit. The switch S3 can be positioned to allow the circuit to cooperate with different extruded materials by giving a variable sensing potential.

It will be understood that, in accordance with the Patent Statutes, only one embodiment of the invention has been described. However, the invention is not so limited and reference should therefore be had to the appended claims in determining the true scope of the invention.

What is claimed is:

1. Apparatus for detecting faults in an extruded insulating or dielectric material formed by an extrusion press having a die block and a central core projecting through the die opening which comprises:
   (1) a cylindrically shaped dielectric mounting ring attached to the die block and surrounding the central core,
   (2) an electrically conducting sensing ring removably, threadably received in a sealed relationship in the mounting ring, and where the radially inner surface of the mounting ring and the sensing ring are of the same diameter and form a concentric cylindrical relationship therebetween and which diameter is slightly greater than the external diameter of the materials being extruded at the die block so the material when expanded after the die block will be closely adjacent or lightly contacting the internal surface of the sensing ring,
   (3) means to provide a high voltage potential to the sensing ring,
   (4) means to ground the central core, and
   (5) circuit means to detect when the voltage potential on the sensing ring drops as a result of a spark having jumped from the detecting ring to the central core.

2. Apparatus according to claim 1 where the circuit means includes a balanced diode bridge for detecting potential change in the sensing ring, a switching transistor held in a non-conducting state when the diode bridge is balanced and conducting when the bridge becomes unbalanced due to a potential change in the sensing ring, indicating means, and a relay controlled by the switching transistor to energize the indicating means when a potential change occurs.

3. Apparatus according to claim 2 which includes means within the circuit to test the operability thereof, and means to change the sensitivity of the circuit to compensate for variable materials and various thicknesses being extruded.

4. Apparatus according to claim 3 where the fault indicating circuit includes means to mark the dielectric with a visible indication when a fault has been detected by the circuit.

5. Apparatus according to claim 1 where the mounting ring and the sensing ring carried thereby are formed of semicircular ring sections joined together by hinge and latch means.

6. Apparatus according to claim 1 which includes a Teflon coating over the internal diameter surfaces of the mounting ring, and where the sensing ring is spaced from the die block by the mounting ring.

* * * * *